Oct. 26, 1943.                W. T. SMITH                2,332,818
                              TEST APPARATUS
                           Filed May 14, 1943
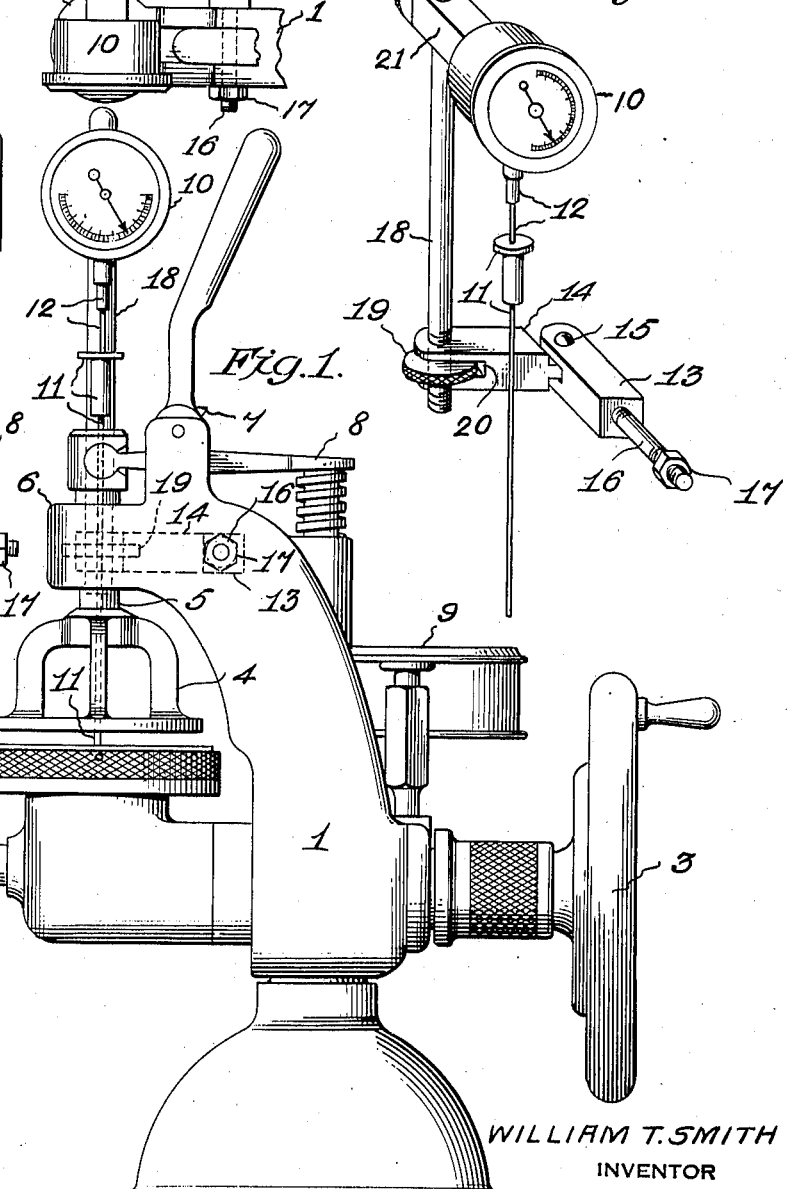
WILLIAM T. SMITH
INVENTOR
BY *Cornelius Zabriskie*
ATTORNEY Patented Oct. 26, 1943

2,332,818

UNITED STATES PATENT OFFICE 2,332,818

TEST APPARATUS

William T. Smith, Rahway, N. J., assignor to Roxalin Flexible Finishes, Inc., Elizabeth, N. J., a corporation of New Jersey Application May 14, 1943, Serial No. 486,983

4 Claims. (Cl. 265—14)

This invention relates to test apparatus for sheet material and more particularly to improvements on the "Mullen" tester which is well known to the art of paper testing. The "Mullen" tester, generally speaking, comprises a pressure head against which sheets of paper to be tested are adapted to be clamped and, while in such clamped position, the machine is manually operable to deliver to one surface of the paper progressive fluid pressures which can be read on a dial associated with the machine. By observing the dial, as the pressure is raised, the strength of the paper and its bursting point may be determined.

I have attempted to use this machine in connection with tests on the bursting strength of doped aeroplane fabrics but the standard machine does not fulfill all requirements for tests of this kind. For example, doped fabric, when used on aircraft, is subjected to air pressures during flight and it is highly desirable to determine the deflection of the fabric under various pressures, such as are met with under such conditions, as well as to determine the ability of the doped fabric to withstand various pressures and the deflection of such fabric under such pressures. This cannot be determined by the standard "Mullen" tester.

According to the present invention, however, I have modified and added to the "Mullen" tester means for accurately measuring deflection under various pressures and for indicating this deflection upon an appropriate dial which, in conjunction with the usual dial of the standard tester, will show the deflection of the doped fabric under test for any particular amount of pressure applied thereto. The use of this apparatus has greatly assisted in the evaluation of doped aeroplane fabrics and fabrics alone, as well as the character of the dope best adapted to be applied thereto.

In its preferred practical form, the invention consists in associating with a "Mullen" tester, a dial micrometer, the operating stem of which extends axially through the clamp post of the tester and is adapted to bear against the fabric under test. The micrometer is preferably so mounted, that the pointer of its dial may be adjusted to "zero" before pressure is applied to the fabric by the tester. When pressure is thereafter applied, the micrometer is responsive to the deflection of the fabric and will show deflection readings corresponding to the pressure increase, so that for any particular pressure the deflection of the fabric may be accurately noted. From these notations curves may be plotted to show characteristics of the doped fabric under various pressures and thus provide a comprehensive graphic showing of the fabric under test. This has never before been possible and tests which have been carried out with the apparatus of this invention have enabled marked improvement in aeroplane fabric dopes.

Features of the invention, other than those adverted to, will be apparent from the hereinafter detailed description and claims, when read in conjunction with the accompanying drawing.

The accompanying drawing illustrates one practical embodiment of the invention, but the construction therein shown is to be understood as illustrative, only, and not as defining the limits of the invention.

Figure 1 is a front elevation of a "Mullen" tester modified to embody the present invention.

Figure 2 is a fragmental end view of so much of the apparatus as is necessary to show the invention as applied to the tester.

Figure 3 is a plan view similarly showing the construction.

Figure 4 is a perspective view showing the part which I have added to the conventional tester in order to embody the present invention therein.

Referring to the drawing, 1 designates generally a standard "Mullen" tester embodying, among other structural elements, a pressure head 2 including therein the usual diaphragm. Hydraulic pressure is supplied to said head by rotating a hand wheel 3. The fabric to be tested, indicated at F, rests upon the head and is clamped thereto by a clamp 4, the post 5 of which extends upwardly through the frame 6 of the machine and is adapted to be acted upon by a handled eccentric or cam 7 bearing against an arm 8. As hydraulic pressure is applied to the diaphragm within the head and from thence to the fabric, readings of applied pressure may be observed on the dial instrument 9 which forms a part of the standard machine.

In associating the invention with a machine of this kind, an axial hole is bored through the clamp post, so that the operating stem of the dial micrometer 10 may be passed downwardly therethrough to permit its lower end to engage the upper surface of the fabric F. Said stem is shown as formed of two coaxial parts 11 and 12 as this arrangement is more convenient.

The dial micrometer may be supported in any one of a number of ways, but a convenient means of support is shown in the accompanying drawing. Here a bracket is provided having two arms 13 and 14 pivoted to one another at 15. The arm 13 is formed with a threaded stud 16 and the frame 6 of the machine is bored to receive this stud. The stud is passed through the hole thus provided and a nut 17 is screwed onto the stud as the front of the frame, to mount the bracket rigidly thereon.

The free end of the arm 14 is vertically bored to receive a micrometer supporting rod 18, the lower end of which is provided with a fine thread and this threaded portion of the rod passes through a knurled adjusting nut 19 positioned within a slot 20 bifurcating the end of the arm 14, as best shown in Figures 2 and 4.

To the back of the case of the dial micrometer an arm 21 is rigidly attached. This arm is perforated for the passage of the supporting rod 18 and a thumb screw 22 threads into the end of this arm to bear against the rod 18 and lock the micrometer at the desired approximate elevation.

In order to position a piece of fabric in the machine for a test, the micrometer with the stem part 12 and with its supporting post and the arm 14 of the bracket are preferably swung in a clockwise direction in Figures 3 and 4 on the pivot 15, so that the micrometer may be positioned out of the way. The stem part 11 may then be lifted partially or entirely out of the clamp post 5 and the fabric F to be tested is placed on the pressure head 2. The clamp 4 is then clamped firmly down on the fabric by operating the handled cam 7. The stem part 11 is thereafter replaced in the axial passage of the clamp post with its lower end resting upon the fabric and the dial micrometer with its supporting post is swung back into position so that the stem part 12 of the instrument is coaxial with and forms a continuation of the stem part 11. The knurled nut 19 is next rotated to give fine vertical adjustment of the micrometer for the purpose of bringing the needle to the "zero" mark on the dial of such instrument. The parts are then in condition for the test.

As the hand wheel 3 is rotated to subject the fabric F to pressure, the applied pressure in pounds may be read on the pressure gauge 9, while the concurrent deflection of the fabric under such pressure may be read on the dial of the micrometer. Notations showing progressive conditions under progressively increasing pressures may meanwhile be noted on graph paper, so that by the time the pressure has become sufficiently great to burst the fabric a complete picture of the behavior of the fabric may be accurately plotted in the form of a graph giving the true characteristics of the sample under test. By testing various samples in the manner specified, comparative results are obtainable which are extremely useful in the evaluation of fabrics without dopes, as well as the combination of both.

The invention has been particularly described in conjunction with the testing of doped aeroplane fabric but it may be employed for testing other materials without departing from the invention.

The foregoing detailed description sets forth the invention in its preferred practical form, but the invention is to be understood as fully commensurate with the appended claims.

Having thus fully described the invention, what I claim as new and desire to secure by Letters Patent is:

1. In an apparatus for testing sheet material wherein fluid pressure is supplied to the material while it is clamped between a pressure head and a coaxial clamp, the combination with said pressure head and clamp of a micrometer, the operating stem of which extends coaxially through the clamp and into engagement with the sheet material clamped between the clamp and the pressure head, and means for manually adjusting the micrometer in a direction axially of its stem to facilitate the setting of the micrometer to zero reading.

2. In an apparatus for testing sheet material wherein fluid pressure is supplied to the material while it is clamped between a pressure head and a clamp carried by a supporting frame, the combination of a micrometer hingedly mounted on the frame with its operating stem normally in engagement with the sheet material clamped on the pressure head, said stem being in separable parts to permit the micrometer to be hingedly moved out of the way when positioning sheet material on or removing it from the pressure head.

3. In an apparatus for testing sheet material wherein fluid pressure is applied to the material while it is clamped between a pressure head and a clamp carried on a supporting frame above and coaxially with the compression head, the combination of a hinged bracket rigidly secured to the frame, an upstanding supporting rod carried by the bracket, and a vertically adjustable micrometer mounted on said supporting rod with the stem of the micrometer normally extending into contact with the sheet material clamped between the head and the clamp.

4. In an apparatus for testing sheet material wherein fluid pressure is applied to the material while it is clamped between a pressure head and a clamp carried on a supporting frame above and coaxially with the compression head, the combination of a hinged bracket rigidly secured to the frame, an upstanding supporting rod carried by the bracket, a supporting rod mounted on the bracket in upstanding position, a micrometer adjustably mounted on the supporting rod with its stem projecting axially downwardly through the clamp into engagement with the surface of the sheet material clamped between the clamp and the pressure head, said supporting rod being bodily longitudinally adjustable in the bracket to facilitate the setting of the micrometer to zero adjustment.

WILLIAM T. SMITH.